United States Patent
Nakashima

(10) Patent No.: US 9,023,421 B2
(45) Date of Patent: May 5, 2015

(54) METHOD FOR PRODUCING MAGNETIC DISK, AND GLASS SUBSTRATE FOR INFORMATION RECORDING MEDIUM

(75) Inventor: Tetsuya Nakashima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/369,395

(22) Filed: Feb. 9, 2012

(65) Prior Publication Data

US 2012/0141668 A1 Jun. 7, 2012

Related U.S. Application Data

(63) Continuation of application No. PCT/JP2011/059212, filed on Apr. 13, 2011.

(30) Foreign Application Priority Data

Apr. 27, 2010 (JP) ................................. 2010-102092

(51) Int. Cl.
*C03C 3/091* (2006.01)
*G11B 5/84* (2006.01)
*G11B 5/73* (2006.01)

(52) U.S. Cl.
CPC .............. *G11B 5/8404* (2013.01); *C03C 3/091* (2013.01); *G11B 5/7315* (2013.01)

(58) Field of Classification Search
CPC ........ C03C 3/083; C03C 17/06; C03C 3/091; G11B 5/84; G11B 5/8404; G11B 5/7315
USPC ............. 428/141, 428, 846, 811.2, 900, 64.2; 65/95, 30.14; 501/66, 69, 135; 360/31, 360/119.01, 122, 234.7, 324.1, 135; 427/127, 128, 130, 180; 106/789
See application file for complete search history.

(56) References Cited

U.S. PATENT DOCUMENTS

| | | | |
|---|---|---|---|
| 3,562,444 A * | 2/1971 | Hoogendoorn et al. | ...... 360/122 |
| 5,948,553 A * | 9/1999 | Kamijo | ........................ 427/128 |
| 6,245,411 B1 | 6/2001 | Goto et al. | |
| 6,344,423 B2 | 2/2002 | Goto et al. | |
| 6,387,509 B1 | 5/2002 | Goto et al. | |
| 6,949,485 B2 | 9/2005 | Nakashima et al. | |
| 7,208,238 B2 | 4/2007 | Ikenishi et al. | |
| 7,972,662 B2 | 7/2011 | Ikenishi et al. | |
| 8,071,493 B2 | 12/2011 | Yagi | |
| 2005/0142321 A1* | 6/2005 | Miyahara et al. | ............ 428/64.2 |
| 2006/0153976 A1* | 7/2006 | Ito et al. | ........................ 427/127 |
| 2008/0241603 A1* | 10/2008 | Isono | ......................... 428/846.9 |
| 2009/0226733 A1* | 9/2009 | Kato et al. | ......................... 65/95 |
| 2010/0039724 A1* | 2/2010 | Onoue et al. | .................. 428/846 |

FOREIGN PATENT DOCUMENTS

| | | |
|---|---|---|
| JP | 09-012333 | 1/1997 |
| JP | 11-314939 | 11/1999 |
| JP | 2000-187828 | 7/2000 |
| JP | 2002-201040 | 7/2002 |
| JP | 2007-161552 A | 6/2007 |
| JP | 2007-164985 | 6/2007 |
| JP | 2009-114005 | 5/2009 |
| JP | 2009-199633 | 9/2009 |
| JP | 2010-059038 | 3/2010 |
| JP | 2010-59038 A | 3/2010 |

OTHER PUBLICATIONS

Takashi, JP 2007-161552, Jun. 2007 Abstract.*
International Search Report issued Jul. 19, 2011 in PCT/JP2011/059212 filed Apr. 13, 2011.
Official Action issued Nov. 15, 2011 in Patent Application No. 2011-532441.

* cited by examiner

*Primary Examiner* — Kevin M. Bernatz
(74) *Attorney, Agent, or Firm* — Oblon, McClelland, Maier & Neustadt, L.L.P.

(57) ABSTRACT

To provide a method for producing a magnetic disk, whereby a magnetic recording layer is formed at a high temperature. A method for producing a magnetic disk, which comprises a step of forming a magnetic recording layer on a glass substrate having a temperature of at least 550° C., wherein the glass substrate comprises, as represented by mol percentage, from 62 to 74% of $SiO_2$, from 6 to 18% of $Al_2O_3$, from 2 to 15% of $B_2O_3$ and from 8 to 21%, in total, of at least one component selected from MgO, CaO, SrO and BaO, provided that the total content of the above seven components is at least 95%, and further contains less than 1%, in total, of at least one component selected from $Li_2O$, $Na_2O$ and $K_2O$, or contains none of these three components.

21 Claims, No Drawings

METHOD FOR PRODUCING MAGNETIC DISK, AND GLASS SUBSTRATE FOR INFORMATION RECORDING MEDIUM

TECHNICAL FIELD

The present invention relates to a method for producing a glass substrate to be used for an information recording medium such as a magnetic disk, optical disk or the like, and a method for producing a magnetic disk, and particularly, it relates to a method for producing a magnetic disk to form a magnetic recording layer at a high temperature, and a method for producing a glass substrate suitable for such a production method.

BACKGROUND ART

In recent years, along with an increase in the recording capacity of a hard disk drive, densification for a high recording density has been in progress at a high pace. However, along with the densification for a high recording density, microfabrication of magnetic particles is likely to impair thermal stability, thus leading to a problem of cross talk or a decrease in the S/N ratio of a playback signal. Under the circumstance, attention has been drawn to a thermal assist magnetic recording technique as a combined technique of optics and magnetism. This is a technique wherein a magnetic recording layer is irradiated with a laser beam or near field light to lower the coercive force locally at the heated portion, and in such a state, an external magnetic field is applied for recording, and the recorded magnetization is retrieved by e.g. GMR element, whereby recording can be made on a high coercive force medium, and it becomes possible to microfabricate magnetic particles while maintaining the thermal stability. However, in order to form a high coercive force medium in the form of a multi-layered film, it is required to sufficiently heat the substrate, and a highly heat resistant substrate is desired.

Further, also for a perpendicular magnetic recording system, a magnetic recording layer different from a conventional one has been proposed in order to meet the requirement for densification for a high recording density, but for the formation of such a magnetic recording layer, the substrate is required to be heated at a high temperature, in many cases.

Whereas, a silicon substrate has been proposed as a substrate which is useful for the above mentioned thermal assist magnetic recording technique (Patent Document 1).

PRIOR ART DOCUMENT

Patent Document

Patent Document 1: JP-A-2009-199633

DISCLOSURE OF INVENTION

Technical Problem

A silicon substrate is usually weak in strength as compared with a glass substrate. Accordingly, also in the production of a magnetic disk to form a magnetic recording layer by heating the substrate at a high temperature, it is preferred to use a glass substrate.

It is an object of the present invention to provide a method for producing such a magnetic disk, and a method for producing a glass substrate for an information recording medium, which is suitable for such a production method.

Solution to Problem

The present invention provides a method for producing a magnetic disk, which comprises a step of forming a magnetic recording layer on a glass substrate having a temperature of at least 550° C., wherein the glass substrate comprises, as represented by mol percentage, from 62 to 74% of $SiO_2$, from 6 to 18% of $Al_2O_3$, from 2 to 15% of $B_2O_3$ and from 8 to 21%, in total, of at least one component selected from MgO, CaO, SrO and BaO, provided that the total content of the above seven components is at least 95%, and further contains less than 1%, in total, of at least one component selected from $Li_2O$, $Na_2O$ and $K_2O$, or contains none of these three components (hereinafter referred to as the first method).

Further, the $Al_2O_3$ content in the glass substrate is typically at least 7 mol %, and in a typical embodiment of the first method, the glass substrate preferably contains from 65 to 69% of $SiO_2$, from 9 to 12% of $Al_2O_3$, from 7 to 12% of $B_2O_3$ and from 10 to 16%, in total, of at least one component selected from MgO, CaO, SrO and BaO.

Further, the present invention provides a method for producing a magnetic disk, which comprises a step of forming a magnetic recording layer on a glass substrate having a temperature of at least 550° C., wherein the glass substrate comprises, as represented by mol percentage, from 67 to 72% of $SiO_2$, from 11 to 14% of $Al_2O_3$, from 0 to less than 2% of $B_2O_3$, from 4 to 9% of MgO, from 4 to 6% of CaO, from 1 to 6% of SrO and from 0 to 5% of BaO, provided that the total content of MgO, CaO, SrO and BaO is from 14 to 18%, and the total content of the above seven components is at least 95%, and further contains less than 1%, in total, of at least one component selected from $Li_2O$, $Na_2O$ and $K_2O$, or contains none of these three components (hereinafter referred to as the second method). Here, "from 0 to less than 2% of $B_2O_3$" means that $B_2O_3$ is contained in an amount of from 0% to less than 2%.

Further, the present invention provides a glass substrate for an information recording medium, which comprises, as represented by mol percentage, from 62 to 74% of $SiO_2$, from 7 to 18% of $Al_2O_3$, from 2 to 15% of $B_2O_3$ and from 8 to 16%, in total, of at least one component selected from MgO, CaO, SrO and BaO, provided that the total content of the above seven components is at least 95%, and further contains less than 1%, in total, of at least one component selected from $Li_2O$, $Na_2O$ and $K_2O$, or contains none of these three components (hereinafter referred to as the glass substrate A).

Further, the present invention provides a glass substrate for an information recording medium, which comprises, as represented by mol percentage, from 62 to 74% of $SiO_2$, from 7 to 18% of $Al_2O_3$, from 7 to 15% of $B_2O_3$ and from 8 to 21%, in total, of at least one component selected from MgO, CaO, SrO and BaO, provided that the total content of the above seven components is at least 95%, and further contains less than 1%, in total, of at least one component selected from $Li_2O$, $Na_2O$ and $K_2O$, or contains none of these three components (hereinafter referred to as the glass substrate B).

Further, the present invention provides a glass substrate for an information recording medium, which comprises, as represented by mol percentage, from 62 to 74% of $SiO_2$, from 7 to 18% of $Al_2O_3$, from 2 to 15% of $B_2O_3$ and from 8 to 21%, in total, of at least one component selected from MgO, CaO, SrO and BaO, provided that the ratio of the total content of SrO and BaO to the content of $B_2O_3$ ($(SrO+BaO)/B_2O_3$) is at most 1.2, and the total content of the above seven components is at least 95%, and further contains less than 1%, in total, of at least one component selected from $Li_2O$, $Na_2O$ and $K_2O$, or contains none of these three components (hereinafter referred to as the glass substrate C).

The present invention, particularly the invention relating to these glass substrates, not only makes it possible that the substrates can be made to have a high temperature in the production of a magnetic disk by forming a magnetic recording layer, but also has an object to make the glass substrates hardly susceptible to breakage as mentioned below.

That is, an information recording medium is often dropped to e.g. a floor by a mistake during its use or transportation, and if a glass substrate is used as the substrate for such an information recording medium, there has been a problem that the glass substrate is broken by the impact.

In order to investigate this problem, the present inventors measured the fracture toughness $S_f$ (unit: $MPa \cdot m^{1/2}$) and the cracking rate p (unit: %) as described below with respect to the glass substrates made of substrate glasses in Examples 4, 15 and 16 given hereinafter (provided that the glass substrate in Example 15 was chemically tempered), and these glass substrates were set in a Microdrive (PC card-type ultrasmall hard disk), and the impact resistance indices $S_{150}$ and $S_{175}$ were measured. The results are shown in Table 1.

TABLE 1

| | Substrate glass | | |
|---|---|---|---|
| | Ex. 4 | Ex. 15 | Ex. 16 |
| $S_f$ | 0.9 | 1.5 | 0.7 |
| p | 0 | 70 | 100 |
| $S_{150}$ | 9.2 | 6.6 | 3.6 |
| $S_{175}$ | 5.2 | 3.4 | 2.4 |

The impact resistance of a usual glass product increases together with the fracture toughness of the glass. However, with the glass substrates for magnetic disks, it has been found that even if the fracture toughness increases, the impact resistance does not necessarily increase, and the impact resistance increases along with a decrease in the cracking rate.

Further, from an investigation of a fracture origin of the glass substrate broken at the time of measuring the impact resistance index, it has been found that while in a usual glass plate, etc., a fracture origin is present at a scratched edge area, in the glass substrate for a magnetic disk, the fracture origin is present at a contact portion, with a clamp or spacer, of the main surface. It is considered that since the main surface is a recording surface, and no defect should essentially be present, a new crack has been formed by the drop impact, and such a crack has become a fracture origin. This fact agrees with the above fact that the impact resistance is related with the cracking rate rather than with the fracture toughness.

Further, the chemically tempered glass substrate in Example 15 is one which has been commonly used for a magnetic disk, but its annealing point is as low as 500° C., and it is not suitable for a thermal assist magnetic recording technique.

The present inventors have found the above described facts and have accomplished the invention of a glass substrate which is suitable for a thermal assist magnetic recording technique and which makes it possible along the object of the present invention to provide a glass substrate whereby the cracking rate is equal or less than a conventional glass substrate for a magnetic disk.

Further, the present invention provides a method for producing a glass substrate for an information recording medium, which comprises a disk-forming step of processing a glass sheet into a glass disk, a lapping step of lapping the main surface of the glass disk, a main surface-polishing step of polishing the lapped main surface of the glass disk, and a cleaning step of cleaning the glass disk between these steps, in these steps or after these steps, wherein the glass plate comprises, as represented by mol percentage, from 62 to 74% of $SiO_2$, from 7 to 18% of $Al_2O_3$, from 2 to 15% of $B_2O_3$ and from 8 to 16%, in total, of at least one component selected from MgO, CaO, SrO and BaO, provided that the total content of the above seven components is at least 95%, and further contains less than 1%, in total, of at least one component selected from $Li_2O$, $Na_2O$ and $K_2O$, or contains none of these three components.

Further, the present invention provides a method for producing a glass substrate for an information recording medium, which comprises a disk-forming step of processing a glass sheet into a glass disk, a lapping step of lapping the main surface of the glass disk, a main surface-polishing step of polishing the lapped main surface of the glass disk, and a cleaning step of cleaning the glass disk between these steps, in these steps or after these steps, wherein the glass plate comprises, as represented by mol percentage, from 67 to 72% of $SiO_2$, from 11 to 14% of $Al_2O_3$, from 0 to less than 2% of $B_2O_3$, from 4 to 9% of MgO, from 4 to 6% of CaO, from 1 to 6% of SrO and from 0 to 5% of BaO, provided that the total content of MgO, CaO, SrO and BaO is from 14 to 18%, and the total content of the above seven components is at least 95%, and further contains less than 1%, in total, of at least one component selected from $Li_2O$, $Na_2O$ and $K_2O$, or contains none of these three components.

In the above method for producing a glass substrate for an information recording medium, the glass disk may be one having a hole at the center i.e. a so-called doughnut-shaped one, or one having no hole. Further, the edge face is usually subjected to chamfering, or etching treatment or mirror polishing may be applied.

Further, the present invention provides the above method for producing a glass substrate for an information recording medium, wherein the annealing point of the glass plate is at least 650° C.

Further, the present invention provides the above method for producing a magnetic disk, wherein the glass sheet is produced by means of a float process or a downdraw method. The downdraw method may, for example, be a fusion method or a slit downdraw method.

Further, the present invention provides the above method for producing a glass substrate for an information recording medium, wherein the information recording medium is a magnetic disk.

Advantageous Effects of Invention

According to the present invention, a magnetic recording layer can be formed on the glass substrate at a high temperature, whereby high densification of a magnetic disk becomes possible.

Further, it becomes possible to produce such a glass substrate.

Further, it is possible not only to form a magnetic recording layer at a high temperature but also to obtain a glass substrate for an information recording medium which has a high possibility of being excellent in impact resistance and minimizing the cracking rate.

Description of Embodiments

In the method for producing a magnetic disk of the present invention, the material for the magnetic recording layer is typically FePt or $SmCo_5$.

Such a magnetic recording layer is formed on a glass substrate by adjusting the temperature of the glass substrate to be at least 550° C. However, the temperature is required to be adjusted to be e.g. at least 600° C. or at least 650° C., as the case requires. Here, the temperature is usually adjusted to be at most 750° C.

In the method for producing a magnetic disk of the present invention, as the case requires, a layer such as an underlayer may be formed between the glass substrate and the magnetic recording layer, or, as the case requires, a layer such as a protective layer may be formed on the magnetic recording layer.

The glass substrate of the present invention and a glass constituting the glass substrate to be used in the method for producing a magnetic disk of the present invention (hereinafter sometimes referred to as the substrate glass) preferably have an annealing point $T_A$ of at least 650° C. If the annealing point is less than 650° C., the glass is likely to undergo warpage during formation of a magnetic recording layer, whereby it tends to become difficult to carry out reading or writing normally. The annealing point is more preferably at least 680° C., particularly preferably at least 700° C., typically at most 750° C.

The cracking rate p (unit: %) of the substrate glass is preferably at most 70%. If it exceeds 70%, the glass tends to be more susceptible to scratching than a conventional glass substrate (one having glass chemically tempered in Example 15 given hereinafter), i.e. stress concentration tends to take place. As a result, brittle fracture tends to occur by a weak stress. The cracking rate p is more preferably at most 50%, particularly preferably at most 30%, most preferably at most 10%.

The cracking rate p is measured as follows.

A glass is polished with cerium oxide abrasive having an average particle size of 2 μm and then polished with colloidal silica abrasive having an average particle size of 20 nm to prepare a glass plate having a thickness of from 1 to 2 mm, a size of 4 cm×4 cm and a surface roughness Ra of at most 0.15 nm. This glass plate is held at the annealing point or the glass transition temperature for 30 minutes and then cooled to room temperature at a rate of 1° C./min or less. On the surface of this glass plate, a Vickers indenter is impressed with a load of 1,000 g in a room controlled to have a temperature of 23° C. and a relative humidity of 70%, whereby the number of cracks formed from its four apexes is measured. This measurement is repeated ten times, whereupon 100×(sum of the numbers of cracks)÷40 is taken as p.

The acid resistance of the substrate glass is preferably at most 0.1 mg/cm². If it exceeds 0.1 mg/cm², surface roughness is likely to occur in a step of polishing or cleaning wherein an acid is employed.

As mentioned above, the glass substrate to be used in the first method is a glass of a composition which comprises, as represented by mol percentage, from 62 to 74% of $SiO_2$, from 6 to 18% of $Al_2O_3$, from 2 to 15% of $B_2O_3$, from 8 to 21% of MgO+CaO+SrO+BaO (hereinafter abbreviated as RO), provided that $SiO_2+Al_2O_3+B_2O_3+RO≥95\%$, and $Li_2O+Na_2O+K_2O<1\%$.

This glass wherein $Al_2O_3$ is at least 7 mol % (hereinafter referred to as glass 1) is a substrate glass suitable in a case where the glass is desired to be hardly susceptible to scratching by reducing the above p.

Each of glasses constituting the above glass substrates A, B and C (hereinafter referred to as glasses A, B and C, respectively) corresponds to glass 1 and is a substrate glass particularly suitable in a case where the glass is desired to be made hardly susceptible to scratching.

The density of glass 1 is preferably at most 2.57 g/cm³, typically at most 2.52 g/cm³. If it exceeds 2.57 g/cm³, the glass is likely to be susceptible to scratching.

Now, the compositions of glass 1 and glasses A, B and C will be described. Firstly, glass 1 will be described, and then, if glass A, B or C has portions different from glass 1, such portions will be described. Here, in the following description of the composition, mol % will be simply represented by %, unless otherwise specified.

$SiO_2$ is an essential component. If $SiO_2$ is less than 62%, the glass is likely to be susceptible to scratching, and it is preferably at least 63%, more preferably at least 65%. On the other hand, if $SiO_2$ exceeds 74%, the melting character decreases, whereby the glass production tends to be difficult, and it is preferably at most 71%, more preferably at most 69%.

$Al_2O_3$ is an essential component. If $Al_2O_3$ is less than 7%, the glass is likely to undergo phase separation, whereby the substrate may not be able to maintain a smooth surface after processing or cleaning, or the glass is likely to be susceptible to scratching, and it is preferably at least 7.5%, more preferably at least 9%. On the other hand, if $Al_2O_3$ exceeds 18%, the melting character decreases, whereby the glass production tends to be difficult, and it is preferably at most 16%, more preferably at most 12%.

Further, in order to make the glass more hardly susceptible to scratching, the total content of $SiO_2$ and $Al_2O_3$ is preferably at least 70%, more preferably at least 72%.

$B_2O_3$ has an effect to improve the melting character or scratching resistance of the glass and is essential. If $B_2O_3$ is less than 2%, the melting character of the glass decreases, and it is preferably at least 5%, more preferably at least 7%, particularly preferably at least 7.3%. Further, in glass B, it is at least 7%. As represented by mass percentage, $B_2O_3$ is typically more than 8%. On the other hand, if $B_2O_3$ exceeds 15%, the glass is likely to undergo phase separation, whereby the substrate tends to be hardly able to maintain a smooth surface after processing or cleaning, and it is preferably at most 14%, more preferably at most 12%.

MgO, CaO, SrO and BaO are components to improve the melting character of the glass, and at least one of them must be contained. If their total content RO is less than 8%, the melting character of the glass decreases, whereby the glass production tends to be difficult, and it is preferably at least 9%, more preferably at least 10%. On the other hand, if RO exceeds 21%, the glass tends to be susceptible to scratching, and it is preferably at most 18%, more preferably at most 16%. Further, in glass A, RO is at most 16%, typically at most 15%.

Among these four components, at least one of MgO and CaO is preferably contained in an amount of at least 3%. If the total content of MgO and CaO i.e. MgO+CaO is less than 3%, the melting of the glass is likely to be difficult, or the glass is likely to be susceptible to scratching. However, if MgO+CaO exceeds 18%, the devitrification temperature tends to be high, whereby forming tends to be difficult, and it is at most 18%.

In a case where MgO is contained, its content is typically at most 8%, and in a case where CaO is contained, its content is typically at most 10%.

Among alkaline earth metal oxides, SrO and BaO are components which make the glass more susceptible to scratching, and in a case where SrO and/or BaO is contained, their total content SrO+BaO is preferably at most 9%.

Further, the ratio in content of SrO+BaO to $B_2O_3$ as a component which makes glass hardly susceptible to scratching i.e. $(SrO+BaO)/B_2O_3$ is preferably at most 1.2, and in glass C, $(SrO+BaO)/B_2O_3$ is at most 1.2.

Glasses 1, A, B and C are essentially composed of the above seven components, but may contain other components within a range not to impair the purpose of the present invention. However, even in such a case, the total content of such other components is less than 5%. If the total content of components other than the above seven components is 5% or more, the glass tends to be susceptible to scratching. In the following, components other than the above seven components will be exemplified.

ZnO is a component to exhibit the similar effect as MgO, CaO, SrO or BaO and may be contained within a range of at most 5%. The sum of the content of ZnO and RO is preferably from 8 to 21%, more preferably at most 16%, typically from 10 to 16%. As represented by mass percentage, the above sum is typically at most 18%.

$Li_2O$, $Na_2O$ and K2O will lower $T_A$, and therefore, the sum of contents of these three components is 0% or less than 1%.

Oxides of atoms having atomic numbers larger than Ti such as V, are likely to make the glass susceptible to scratching, and therefore, in a case where such oxides are contained, the sum of their contents is preferably at most 3%, more preferably at most 2%, particularly preferably at most 1%, most preferably at most 0.3%.

$SO_3$, F, Cl, $As_2O_3$, $Sb_2O_3$, $SnO_2$, etc. are typical components as refining agents.

As mentioned above, the glass substrate to be used in the second method is made of glass (hereinafter after referred to as glass 2) which comprises from 67 to 72% of $SiO_2$, from 11 to 14% of $Al_2O_3$, from 0 to less than 2% of $B_2O_3$, from 4 to 9% of MgO, from 4 to 6% of CaO, from 1 to 6% of SrO, from 0 to 5% of BaO and from 14 to 18% of RO, provided that $SiO_2+Al_2O_3+B_2O_3+RO \geq 95\%$, and $Li_2O+Na_2O+K_2O<1\%$.

Glass 2 is a substrate glass suitable in a case where it is desired to increase $T_A$ or the acid resistance.

Now, the composition of glass 2 will be described.

$SiO_2$ is an essential component. If it is less than 67%, the glass tends to be susceptible to scratching. On the other hand, if it exceeds 72%, the melting character decreases, whereby the glass production tends to be difficult.

$Al_2O_3$ is an essential component. If it is less than 11%, the glass is likely to undergo phase separation, whereby the substrate tends to be hardly able to maintain a smooth surface after processing or cleaning, or the glass tends to be susceptible to scratching. On the other hand, if it exceeds 14%, the melting character decreases, whereby the glass production tends to be difficult.

$B_2O_3$ is not an essential component, but it has an effect to improve the melting character or the scratching resistance of the glass and thus may be contained within a range of less than 2%. If it is 2% or more, the acid resistance or $T_A$ is likely to decrease.

MgO, CaO and SrO are components to improve the melting character of the glass and are essential. If the contents of MgO, CaO and SrO are, respectively, less than 4%, less than 4% and less than 1%, the melting character decreases. If the contents of MgO, CaO and SrO are, respectively, more than 9%, more than 6% and more than 6%, the glass tends to be susceptible to scratching.

BaO is not an essential component, but has an effect to improve the melting character of the glass and may be contained within a range of at most 5%. If it exceeds 5%, the glass tends to be susceptible to scratching. If RO is less than 14%, the melting character of the glass decreases, whereby the glass production tends to be difficult. On the other hand, if RO exceeds 18%, the glass tends to be susceptible to scratching.

Glass 2 is essentially composed of the above seven components, but may contain other components in a total amount of less than 5% within a range not to impair the purpose of the present invention. If the sum of contents of components other than the above seven components is 5% or more, the glass tends to be susceptible to scratching. In the following, components other than the above seven components will be exemplified.

ZnO is a component to exhibit the similar effect as MgO, CaO, SrO or BaO and may be contained within a range of at most 5%. The sum of the content of ZnO and RO is preferably from 8 to 21%, more preferably from 10 to 16%.

$Li_2O$, $Na_2O$ and $K_2O$ will lower $T_A$, and therefore, the sum of contents of these three components is 0% or less than 1%.

Oxides of atoms having atomic numbers larger than Ti, such as V, are likely to make glass susceptible to scratching, and therefore, in a case where these oxides are contained, the sum of their contents is preferably adjusted to be at most 3%, more preferably at most 2%, particularly preferably at most 1%, most preferably at most 0.3%.

$SO_3$, F, Cl, $As_2O_3$, $Sb_2O_3$, $SnO_2$, etc. are typical components as a refining agent.

EXAMPLES

17 Glasses having the compositions as represented by mol percentage in the rows for $SiO_2$ to BaO in Table 2 and in the rows for $SiO_2$ to $K_2O$ in Table 3 were prepared. With respect to these glasses, the linear expansion coefficient α (unit: $10^{-7}/°C.$), the density d (unit: $g/cm^3$), the Young's modulus E (unit: GPa), the specific modulus E/d (unit: MNm/kg), the acid resistance index A (unit: $mg/cm^2$), the strain point $T_{Str}$ (unit: °C.), the annealing point $T_A$ (unit: °C.), the temperature $T_4$ (unit: °C.) at which the viscosity becomes $10^4$ dPa·s, the temperature $T_2$ (unit: °C.) at which the viscosity becomes $10^2$ dPa·s, the fracture toughness St (unit: $MPa·m^{1/2}$) and the cracking rate p (unit: %) were measured or calculated. One identified by * is a value calculated or estimated from the composition.

With respect to the above measurements, p was carried out as described above, and other were carried out as follows.

Linear expansion coefficient: by means of a differential thermal dilatometer and using quartz glass as a reference sample, the elongation rate of glass at the time of raising the temperature at a rate of 5° C./min from room temperature, was measured up to the temperature at which elongation became no longer observed as the glass was softened i.e. up to the yield point, and from the obtained thermal expansion curve, an average linear expansion coefficient in a range of from 50 to 350° C. was calculated.

Density: measured by an Archimedes method, with respect to from 20 to 50 g of glass free from bubbles.

Young's modulus: measured by an ultrasonic pulse method with respect to a glass plate having a thickness of from 5 to 10 mm and a size of 3 cm×3 cm.

Acid resistance: a glass was immersed in 0.1 N hydrochloric acid at 90° C. for 20 hours, whereby the weight reduction was measured, and the acid resistance was obtained by dividing the weight reduction by the sample surface area.

Strain point, annealing point: measured in accordance with JIS R3103.

$T_4$, $T_2$: measured by means of a rotational viscometer.

Fracture toughness $S_t$: measured in accordance with an indentation fracture method (IF method) prescribed in JIS R1607.

Examples 1 to 14 are substrate glasses to be used in the present invention. Among them, Examples 1 to 13 are the above mentioned glass 1, and among them, Examples 1 to 11 are excellent in impact resistance. Example 14 is the above mentioned glass 2 and is excellent in acid resistance.

Examples 15 to 17 are substrate glasses for comparison, and the measurement of p of Example 15 was carried out with respect to chemically tempered glass.

Further, with respect to Examples 4, 15 and 16, the impact resistance index $S_{150}$ and the impact resistance index $S_{175}$ were measured as follows.

$S_{150}$: a glass sheet processed into a disk shape with an outer diameter of 27 mm was set on a Microdrive manufactured by IBM, and this Microdrive was dropped onto a precision stone platen from a height of 150 cm. In a case where the glass plate was not broken, the Microdrive was again dropped onto the same platen from the same height, and a test was carried out to investigate the number of dropping times until the glass plate was broken. This test was carried out five times, and an average of the number of dropping times was calculated and taken as the impact resistance index $S_{150}$.

$S_{175}$: the impact resistance index $S_{175}$ was obtained in the same manner as in the case of obtaining $S_{150}$ except that the glass plate was dropped from a height of 175 cm.

As mentioned above, from such results, the present inventors have found that the impact resistance indices $S_{150}$ and $S_{175}$ have an interrelation with the cracking rate p rather than with the fracture toughness $S_t$.

Further, the compositions, as represented by mass percentage, of glasses of Examples 1 to 17 are shown in Tables 4 and 5.

TABLE 2

| | Ex. | | | | | | | | |
|---|---|---|---|---|---|---|---|---|---|
| | 1 | 2 | 3 | 4 | 5 | 6 | 7 | 8 | 9 |
| $SiO_2$ | 67.6 | 67.6 | 68.2 | 66.2 | 67.4 | 67.2 | 67.5 | 68.0 | 63.0 |
| $Al_2O_3$ | 11.4 | 10.2 | 10.4 | 11.3 | 11.1 | 10.6 | 8.8 | 7.8 | 15.0 |
| $B_2O_3$ | 8.7 | 10.2 | 9.8 | 7.6 | 10.0 | 10.6 | 8.2 | 8.2 | 10.0 |
| MgO | 1.4 | 2.0 | 0 | 5.3 | 2.2 | 2.9 | 3.0 | 4.0 | 1.0 |
| CaO | 5.2 | 5.4 | 6.8 | 4.7 | 8.8 | 6.7 | 5.0 | 5.0 | 2.0 |
| SrO | 1.3 | 2.0 | 3.9 | 4.9 | 0.6 | 1.7 | 6.0 | 4.5 | 3.0 |
| BaO | 4.3 | 2.7 | 1.0 | 0 | 0 | 0.3 | 1.5 | 2.5 | 6.0 |
| RO | 12.2 | 12.0 | 11.7 | 14.9 | 11.5 | 11.6 | 15.5 | 16.0 | 12.0 |
| α | 38 | 38 | 38 | 38 | 34 | 34 | 42 | 40 | 38 |
| d | 2.55 | 2.49 | 2.51 | 2.50 | 2.38 | 2.40 | 2.55 | 2.56 | 2.63 |
| E | 70 | 68 | 74 | 77 | 73 | 72 | 73 | 73 | 74 |
| E/d | 28 | 27 | 30 | 31 | 31 | 30 | 29 | 28 | 28 |
| A | 0.1 | 0.1 | 0.1 | 0.1 | 0.1 | 0.1 | 0.1 | 0.1 | 0.3* |
| $T_{Str}$ | 660 | 635 | 650 | 670 | 660 | 650 | 613 | 610 | 694 |
| $T_A$ | 722 | 692 | 703 | 725 | 722 | 710 | 667 | 664 | 747 |
| $T_4$ | 1320 | 1300 | 1300* | 1270 | 1300 | 1300* | 1300* | 1290* | 1310* |
| $T_2$ | 1720 | 1740 | 1730* | 1670 | 1690 | 1690* | 1680* | 1690* | 1630* |
| $S_t$ | 0.9 | 0.9 | 0.9 | 0.9 | 0.9 | 0.9 | 0.9 | 0.9 | 0.9 |
| p | 0 | 0 | 0 | 0 | 0 | 0 | 0 | 0 | 0 |
| $S_{150}$ | — | — | — | 9.2 | — | — | — | — | — |
| $S_{175}$ | — | — | — | 5.2 | — | — | — | — | — |

TABLE 3

| | Ex. | | | | | | | |
|---|---|---|---|---|---|---|---|---|
| | 10 | 11 | 12 | 13 | 14 | 15 | 16 | 17 |
| $SiO_2$ | 65.0 | 66.0 | 68.0 | 68.0 | 70.8 | 66.5 | 66.5 | 100 |
| $Al_2O$ | 8.0 | 10.0 | 9.4 | 6.0 | 12.5 | 8.5 | 4.5 | 0 |
| $B_2O_3$ | 12.0 | 15.0 | 6.1 | 6.0 | 1.3 | 0 | 0 | 0 |
| MgO | 6.0 | 1.0 | 0.1 | 5.0 | 5.0 | 0 | 3.5 | 0 |
| CaO | 2.0 | 3.0 | 7.0 | 5.0 | 5.2 | 0 | 6.0 | 0 |
| SrO | 7.0 | 4.0 | 2.6 | 5.0 | 1.5 | 0 | 5.0 | 0 |
| BaO | 0 | 1.0 | 6.8 | 5.0 | 3.7 | 0 | 3.5 | 0 |
| $ZrO_2$ | 0 | 0 | 0 | 0 | 0 | 2.5 | 1.5 | 0 |
| $Li_2O$ | 0 | 0 | 0 | 0 | 0 | 11.5 | 0 | 0 |
| $Na_2O$ | 0 | 0 | 0 | 0 | 0 | 11.0 | 5.0 | 0 |
| $K_2O$ | 0 | 0 | 0 | 0 | 0 | 0 | 4.5 | 0 |
| RO | 15.0 | 9.0 | 16.5 | 20.0 | 15.4 | 0 | 18.0 | 0 |
| α | 39 | 34 | 46 | 49 | 38 | 92 | 83 | — |
| d | 2.48 | 2.40 | 2.72 | 2.70 | 2.63 | 2.52 | 2.77 | — |
| E | 71 | 64 | 74 | 76 | 82 | 83 | 76 | — |
| E/d | 29 | 27 | 27 | 28 | 31 | 34 | 27 | — |
| A | 0.2* | 0.3* | 0.1 | 0.1* | 0 | 0 | 0 | — |
| $T_{Str}$ | 634 | 640 | 644 | 640 | 730 | 450 | 570 | — |
| $T_A$ | 686 | 694 | 697 | 695 | 786 | 500 | 620 | — |
| $T_4$ | 1230* | 1280* | 1340* | 1290* | 1350 | 1020 | 1140 | >1600 |
| $T_2$ | 1650* | 1730* | 1680* | 1640* | 1720 | 1500 | 1540 | >2000 |
| $S_t$ | 0.9 | 0.9 | 0.9 | 0.9 | 0.9 | 1.5 | 0.7 | 0.8 |
| P | 0 | 0 | 100 | 100 | 100 | 70 | 100 | 100 |
| $S_{150}$ | — | — | — | — | — | 6.6 | 3.6 | — |
| $S_{175}$ | — | — | — | — | — | 3.4 | 2.4 | — |

TABLE 4

| | Ex. | | | | | | | | |
|---|---|---|---|---|---|---|---|---|---|
| | 1 | 2 | 3 | 4 | 5 | 6 | 7 | 8 | 9 |
| $SiO_2$ | 57.6 | 58.9 | 59.6 | 59.7 | 62.1 | 61.0 | 59.8 | 60.6 | 51.2 |
| $Al_2O_3$ | 16.5 | 15.0 | 15.4 | 17.4 | 17.3 | 16.4 | 13.2 | 11.8 | 20.7 |
| $B_2O_3$ | 8.6 | 10.3 | 9.9 | 8.0 | 10.7 | 11.1 | 8.4 | 8.5 | 9.4 |
| MgO | 0.8 | 1.2 | 0 | 3.2 | 1.3 | 1.8 | 1.8 | 2.4 | 0.5 |
| CaO | 4.2 | 4.4 | 5.6 | 4.0 | 7.5 | 5.7 | 4.1 | 4.2 | 1.5 |
| SrO | 1.9 | 3.0 | 5.8 | 7.6 | 1.0 | 2.7 | 9.2 | 6.9 | 4.2 |
| BaO | 9.4 | 5.9 | 2.1 | 0 | 0 | 0.7 | 3.4 | 5.7 | 12.4 |

TABLE 5

| | Ex. | | | | | | | |
|---|---|---|---|---|---|---|---|---|
| | 10 | 11 | 12 | 13 | 14 | 15 | 16 | 17 |
| $SiO_2$ | 58.9 | 58.3 | 56.9 | 59.4 | 61.0 | 64.5 | 57.9 | 100 |
| $Al_2O_3$ | 12.3 | 15.0 | 13.4 | 8.9 | 18.2 | 14.0 | 6.6 | 0 |
| $B_2O_3$ | 12.6 | 15.3 | 5.9 | 6.1 | 1.3 | 0 | 0 | 0 |
| MgO | 3.6 | 0.6 | 0.1 | 2.9 | 2.9 | 0 | 2.0 | 0 |
| CaO | 1.7 | 2.5 | 5.5 | 4.1 | 4.2 | 0 | 4.9 | 0 |
| SrO | 10.9 | 6.1 | 3.8 | 7.5 | 2.2 | 0 | 7.5 | 0 |
| BaO | 0 | 2.3 | 14.5 | 11.1 | 8.1 | 0 | 7.8 | 0 |
| $ZrO_2$ | 0 | 0 | 0 | 0 | 0 | 5.0 | 2.7 | 0 |
| $Li_2O$ | 0 | 0 | 0 | 0 | 0 | 5.5 | 0 | 0 |
| $Na_2O$ | 0 | 0 | 0 | 0 | 0 | 11.0 | 4.5 | 0 |
| $K_2O$ | 0 | 0 | 0 | 0 | 0 | 0 | 6.1 | 0 |

INDUSTRIAL APPLICABILITY

The present invention is useful for the production of a magnetic disk and a glass substrate for an information recording medium.

This application is a continuation of PCT Application No. PCT/JP2011/059212 filed on Apr. 13, 2011, which is based upon and claims the benefit of priority from Japanese Patent Application No. 2010-102092 filed on Apr. 27, 2010. The contents of those applications are incorporated herein by reference in its entirety.

What is claimed is:

1. A method for producing a magnetic disk, the method comprising:
   (a) preparing glass comprising, by mol percent:
      from 62 to 74% of $SiO_2$;
      from 6 to 18% of $Al_2O_3$;
      from 2 to 15% of $B_2O_3$;
      from 8 to 21%, in total, of at least one component selected from the group consisting of MgO, CaO, SrO, and BaO; and
      from 0 to less than 1%, in total, of at least one component selected from the group consisting of $Li_2O$, $Na_2O$, and $K_2O$,
      wherein a total content of $SiO_2$, $Al_2O_3$, $B_2O_3$, MgO, CaO, SrO, and BaO is at least 95%,
   (b) forming a glass substrate from the glass, cooling the glass substrate to room temperature, and polishing the surface of the glass substrate,
   wherein surface roughness Ra after polishing the glass substrate is at most 0.15 nm and an acid resistance index is at most 0.1 mg/cm$^2$,
   wherein a cracking rate p of the polished glass substrate is at most 10%, wherein the cracking rate p is measured after the polished glass substrate is heated at a temperature of at least 550° C. and then cooled to room temperature,
   (c) forming a magnetic recording layer on the polished glass substrate by adjusting a temperature of the glass substrate to be at least 550° C., which is a temperature of the magnetic recording layer upon forming, thereby forming the magnetic disk, and then cooling the magnetic disk to room temperature,
   wherein the formed magnetic disk has an impact resistance index $S_{150}$ of at least 9.2 and $S_{175}$ of at least 5.2.

2. The method of claim 1, wherein the glass substrate comprises at least 7% of $Al_2O_3$.

3. The method of claim 1, wherein the glass substrate comprises from 3 to 18%, in total, of at least one component selected from the group consisting of MgO and CaO.

4. The method of claim 1, wherein the glass substrate comprises at most 16%, in total, of at least one component selected from the group consisting of MgO, CaO, SrO, and BaO.

5. The method of claim 4, wherein the glass substrate comprises at least 3%, in total, of at least one component selected from the group consisting of MgO and CaO.

6. The method of claim 1, wherein the glass substrate comprises at least 7% of $B_2O_3$.

7. The method of claim 1, wherein the glass substrate comprises:
   from 65 to 69% of $SiO_2$;
   from 9 to 12% of $Al_2O_3$;
   from 7 to 12% of $B_2O_3$; and
   from 10 to 16%, in total, of at least one component selected from the group consisting of MgO, CaO, SrO, and BaO.

8. The method of claim 1, wherein, in the glass substrate, a ratio of a total content of SrO and BaO to a content of $B_2O_3$, ((SrO+BaO)/$B_2O_3$), is at most 1.2.

9. The method of claim 1, wherein the glass substrate comprises, by mass percent, more than 8% of $B_2O_3$.

10. The method of claim 1, wherein the glass substrate has a density of at most 2.57 g/cm$^3$.

11. The method of claim 1, wherein the glass substrate has an annealing point of at least 650° C.

12. The method of claim 11, wherein the glass substrate has an annealing point of at most 750° C.

13. The method of claim 12, wherein the glass substrate has an annealing point of at least 680° C.

14. The method of claim 12, wherein the glass substrate has an annealing point of at least 700° C.

15. The method of claim 1, wherein the magnetic recording layer comprises FePt.

16. The method of claim 1, wherein the magnetic recording layer comprises SmCo$_5$.

17. The method of claim 1, wherein the glass substrate has an annealing point of at most 750° C.

18. The method of claim 1, wherein the glass substrate has a density of at most 2.52 g/cm$^3$.

19. The method of claim 1, wherein the glass substrate has a cracking rate, by unit percent, of at most 70%.

20. The method of claim 19, wherein the cracking rate of the glass substrate is at most 50%.

21. The method of claim 1, wherein a cooling rate of the glass substrate with the magnetic recording layer is 1° C./min or less.

* * * * *